United States Patent
Sheng

(10) Patent No.: US 6,783,871 B2
(45) Date of Patent: Aug. 31, 2004

(54) DIRECT BOND OF STEEL AT LOW TEMPERATURES

(75) Inventor: Peisheng Sheng, Wilmington, DE (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/116,165

(22) Filed: Apr. 5, 2002

(65) Prior Publication Data

US 2003/0189087 A1 Oct. 9, 2003

(51) Int. Cl.$^7$ .......................... B32B 15/04; B32B 15/18
(52) U.S. Cl. ..................... 428/682; 428/685; 428/683; 428/684; 428/609; 428/220
(58) Field of Search ............................ 428/681, 682, 428/685, 683, 684, 220, 609, 601, 940; 228/234.1, 235.3; 141/236; 96/107

(56) References Cited

U.S. PATENT DOCUMENTS

| | | | |
|---|---|---|---|
| 3,693,242 A | 9/1972 | Chivinsky | |
| 3,862,484 A | 1/1975 | Chivinsky | |
| 3,928,711 A | * 12/1975 | Jakobsen | 174/11 R |
| 3,956,809 A | * 5/1976 | Chivinsky | 29/196.1 |
| 4,688,622 A | * 8/1987 | Gellert | 164/61 |
| 4,736,884 A | * 4/1988 | Tsuyama et al. | 228/200 |
| 4,794,055 A | * 12/1988 | Matsumura et al. | 429/35 |
| 5,055,362 A | * 10/1991 | McCormick et al. | 428/683 |
| 5,370,946 A | * 12/1994 | Parayil | 428/685 |
| 5,664,040 A | * 9/1997 | Kramer et al. | 365/78 |
| 5,918,289 A | * 6/1999 | Scheppers et al. | 73/863.21 |
| 5,957,116 A | * 9/1999 | Haegele et al. | 123/568.12 |

* cited by examiner

Primary Examiner—Michael La Villa

(57) ABSTRACT

The instant invention is directed to a bonded product, such as a manifold, for gas or liquid chromatographs, and a method for making the same. The bonded product is made using the following steps: (i) contacting two or more steel sheets; (ii) heating the contacted sheets to a temperature substantially below the melting temperature of the sheets; (iii) applying pressure to the contacted sheets; and (iv) cooling the contacted sheets. No intermediate foreign material is used to bond the steel sheets, e.g., no welding material or TLP diffusion bonding plate is utilized. Nonetheless, a strong, leak free bond is generated at temperatures as low as 1700° F. (926.6° C.). The bond is molecular in nature, as evidenced by grains that grow from one sheet to another across the interface between the two sheets.

7 Claims, 1 Drawing Sheet

DIRECT BOND OF STEEL AT LOW TEMPERATURES

TECHNICAL FIELD

The instant invention relates to a process for bonding steel sheet together, as well as manifolds and other products made using the same. More specifically, the instant invention relates a process for bonding steel sheet together, at relatively low temperatures (circa 1900° F., 1037.8° C.), without using intermediate bonding agents.

BACKGROUND

In the art of gas and/or liquid chromatograph devices, channels are used to connect different flow components. For example, a channel may be used to connect a valve to a regulator, or to connect a valve to a pressure sensor, or to connect a valve to a detector. These channels can be made from tubes and fittings. Preferably, however, these channels are etched in the interior of a manifold. As used herein, the term "manifold" means any construct of two or more metal sheets that contain one or more channels etched into its interior.

The channels are generally formed by etching mirror image metal sheets. The metal sheets are then contacted and bonded to form the manifold. The etched surfaces on the metal sheets, when combined, form the channels. For gas chromatograph applications, it is extremely important to create a strong leak free bond between the metal sheets. Otherwise, the channels may burst due to pressure exerted by chemicals run through the channels.

Conventionally, the channels are made by etching and contacting two pieces of stainless steel sheet (generally 316L). Transient liquid phase (TLP) diffusion is then used to create a leak proof bond. TLP diffusion bonding requires plating a layer of sulfamate nickel followed by a layer of electroless nickel (11%±1% phosphorous) on the surface to be bonded. The plated layers act like a glue and permit bonding at relatively low temperatures, circa 1800° F. (982.2° C.). In contrast, bonding by fusion requires temperatures at or near the melting point of the stainless steel sheets.

However, the plating process is manually operated and difficult to control. A number of parameters, including plate composition, homogeneity, uniformity, and thickness, affect the nature of the bond ultimately obtained. Furthermore, it is difficult to adequately measure and, therefore, monitor plating. For example, Glow Discharge Spectroscopy is capable of measuring the depth composition profile of a plated layer but it is extremely expensive and needs absolute standards for instrument calibration.

It would be desirable to eliminate the need for TLP diffusion bonding without losing the ability to generate low temperature bonds. Unfortunately, until the instant invention, it was believed that solid state diffusion bonds would not form between like materials absent temperatures near the material's melting point (even under load). The melting point of steel is extremely high. For example, 316L stainless steel sheet melts at around 2540–2630° F. (1379.4–1428.9° C.). Operating at such high temperatures requires special equipment and is expensive.

SUMMARY

In the instant invention, multiple steel sheets are bonded at temperatures as low as 1700° F. (926.6° C.) without using the TLP diffusion bonding process. The invention eliminates the need for the plating step in TLP diffusion bonding, and the troubles associated with the same. Accordingly, it is simpler and more reliable. The instant invention generates a leak tight bond with high bond strength without affecting the properties of the steel.

The invention bonds the steel sheet through the following steps: (i) contacting two or more steel sheets; (ii) heating the contacted sheets to a temperature substantially below their melting temperatures; (iii) applying pressure to the contacted sheets; and (iv) cooling the contacted sheets. Products, such as manifolds, made in accordance with the invention, have an interface between the bound sheets, no intermediate foreign bonding material, and grains that grow from one sheet across the interface into the other sheet.

The peak temperatures employed in the invention are at least about 1700° F. and at least about 200° F. below the melting temperature of the steel. Accordingly, this is a low temperature process that, like the TLP diffusion bonding process, does not require great expense or specialized equipment.

DETAILED DESCRIPTION

Figure 1:
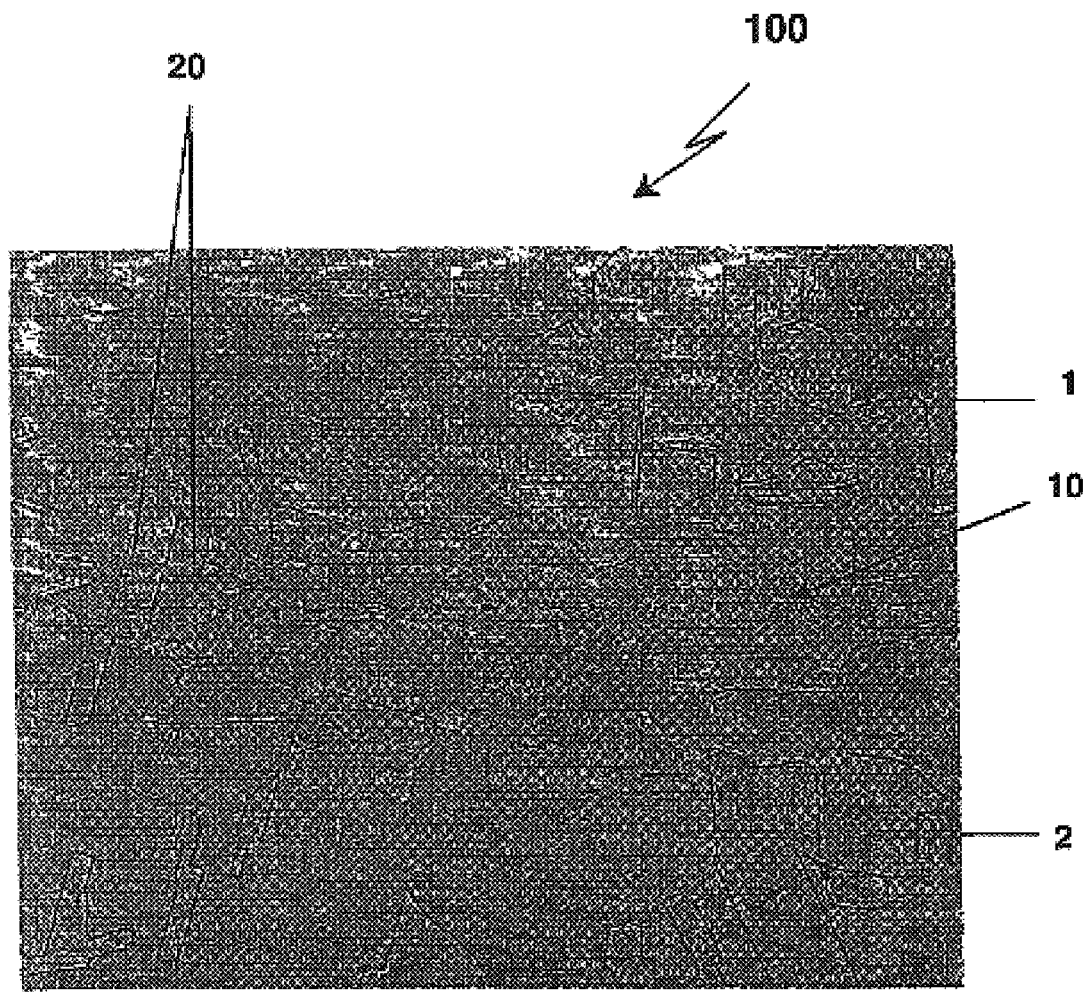
FIG. 1 is an optical micrograph of two pieces of steel sheet bonded in accordance with the instant invention.

The instant invention is called "Direct Bond" because it directly bonds two or more pieces of steel sheet together without the use of any intermediary bonding composition. The bonds formed between the pieces of steel sheet are the result of molecular interactions between like materials, as evidenced by the grains in each steel sheet that, upon heating, pressurizing, and cooling, grow across the line of interface between the sheets. Until the instant invention, it was believed that solid state diffusion bonds would not form between like materials absent temperatures near the melting point, even under load.

Preferably, the steel sheet employed in the invention is stainless steel sheet. More preferably, the steel sheet employed is 316 or 316L stainless steel sheet. Most preferably, the steel sheet employed is 316L stainless steel sheet. Type 316 steel is an austenitic chrome nickel steel with superior corrosion resistance compared to other chrome nickel steels. It is widely employed for purposes where exposure to chemical corrodents or marine atmospheres is expected, e.g., gas chromatograph applications. Its percent composition is as follows:

Carbon: 0.08 max

Manganese: 2.00 max

Phosphorus: 0.045 max

Sulphur: 0.030 max

Silicon: 1.00 max

Chromium: 16.00/18.00

Nickel: 10.00/14.00

Molybdenum: 2.00/3.00

Type 316L steel is identical to type 316 with the exception that the carbon content has been lowered to 0.03% max. in order to increase the corrosion resistance at heat affected zones.

The steel sheet, absent etching, should be continuous. In addition, the un-etched surfaces of the steel sheet should be smooth and flat. Generally, the surface finish is better than ASTM 2B.

The pieces of steel sheet being bonded should be similar in composition. Preferably, the pieces of steel sheet are identical in composition.

Preferably, the steel sheet is etched, since one of the principle purposes of the invention is to produce manifolds for use in gas or liquid chromatography. As stated, such manifolds contain etched channels for transporting liquids and gases. However, there are many uses for bound steel products other than manifolds, some of which may or may not require etching. Therefore, etching is merely a preference, not a requirement, of the invention.

Etching can be accomplished using any conventional process. Preferably, mirror image etched surfaces are contacted so that the interface contains channels that, if adequately bonded, can be used in gas and liquid chromatographs to connect valves to regulators, to connect valves to pressure sensors, and to connect valves to detectors.

In the instant invention, multiple pieces of steel sheet are first sandwiched together. Preferably, the steel sheets are arranged into pairs, and the invention will be described according to this preferred embodiment. However, it should be recognized that the sheets can be arranged in any number, e.g., triplets, quadruplets, etc . . . The invention, for example, has proven equally effective in bonding groups of four and five steel sheets.

Each steel sheet pair is assembled in, or alternatively moved into, a furnace. Multiple pairs can be stacked, one on top of another, within the furnace, as long as each pair is separated from the other pairs by ceramic spacers. If ceramic spacers, or the like, are not employed, then all of the sheets will bond together into one large block.

The steel sheet pairs are heated to a temperature of at least 1700° F. (926.6° C.) in a vacuum furnace, preferably in the presence of reduced hydrogen (2×10E−4 Torr). Most preferably, the steel sheet pairs are heated to a temperature of circa 1925° F. (1041.2° C.). Regardless, the pairs should not be heated higher than a temperature that is at least about 200° F., and preferably at least about 400° F., below the melting point of the steel. This is because the bonding process is not a fusion process, which is more expensive and requires special equipment. Instead, the invention is a low temperature bonding process. For example, 1700° F. is well below the melting point for 316L stainless steel sheet, which is around 2540–2630° F. (1379.4–1428.9° C.). After the sheet pairs are heated, they are vacuum cooled.

During furnace operation, at least one load ranging anywhere from 2000 to 6400 pound-force is applied to the stack of steel sheet pairs. Since the stainless steel sheet that is generally used is approximately 3.5"×4.5" in size, this calculates to approximately 125–375 psi of pressure. Preferably, multiple loads are applied and removed during the process.

The preferred temperature and load ramp for use in the invention, when 316L stainless steel sheet is employed, is as follows:

1. Wait until the furnace reaches 1000° F.;
2. Heat to 1650° F. at ramp of 650° F. per hour and hold for 12 minutes. During the heating, slowly increase the load and reach 3000 pound-force at 1650° F.
3. Heat to 1750° F. at ramp of 400° F. per hour, hold for 12 minutes. Slowly reduce load to zero and reapply 2000 pound-force at 1750° F.
4. Heat to 1850° F. at ramp of 300° F. per hour, hold for 6 minutes. Slowly reduce load to zero and reapply 2000 pound-force at 1850° F.
5. Heat to 1925° F. at ramp of 250° F. per hour, hold for 2 hours. After reaching 1925° F., wait for 15 minutes before slowly increasing the load until 6400 pound-force;
6. Cool down to 1750° F., at −400° F. per hour. Reduce the load slowly.
7. Cool down to 1250° F., at −600° F. per hour.
8. Cool down to room temperature.

After heating, pressurizing, and cooling, the steel sheet pairs are removed from the furnace. At this point, the pairs have bonded together. An optical micrograph of the bond shows an interface and grains that cross the interface from one sheet to the other. This growth in grain across the interface is evidence of the molecular nature of the bond.

FIG. 1 is an optical micrograph (200× magnitude factor) of a bonded structure 100 formed in accordance with the invention from steel sheets 1 and 2, respectively. Steel sheets 1 and 2 contact at an interface 10. As can be seen, grains 20, originating from steel sheets 1 and 2 have grown across interface 10. The growth of grains 20 across the interface 10 demonstrates the molecular nature of the bond that now exists between steel sheets 1 and 2. Steel sheets 1 and 2 are now virtually one material. Prior to the process, the grains 20 in the steel sheets 1 and 2 were about 1000 micro inches (circa 25 microns; ASTM grain size 8) in length and fully contained within one steel sheet. Under heat and pressure, steel sheets 1 and 2 were squeezed into one another and bonded on a molecular level. The grains 20 then grew, across the interface 10, to a length of about 16000 micro-inches (circa 400 microns; ASTM grain size<8).

The bond produced by the invention is very strong. To test the adhesive strength of the bond, a T277865 Burst Tester was employed. The T277865 Burst Tester is a constant-flow, high pressure "hydraulic" system that is designed to purge and pressurize a channel within a manifold with HPLC-grade isopropyl alcohol. The device measures the pressure (to the nearest 0.1 bar), at any point in time, within the channel. Using the T277865 Burst Tester, the internal pressure necessary to burst a channel formed by bonding two etched steel sheets in accordance with the invention was measured. The test was taken to the device's limit of 340 bar (circa 5,000 psig). At no point did the manifold rupture.

The bond produced by the invention is also leak proof. This is easily demonstrated on commercially available helium leak detectors.

The instant invention is directed to products made in accordance with the invention. These products have an interface visible using an optical micrograph, which distinguishes them from fused products, i.e., products that are basically melted together at, or above, the melting temperature of steel sheet. Furthermore, these products show grain growth across the interface between the bound steel sheets, which is evidence of the molecular nature of the bond. Generally, the average grain diameter before bonding is approximately 1000 micro-inches (circa 25 microns; ASTM grain size 8) and the average grain diameter after bonding is approximately 16000 micro-inches (circa 400 microns; ASTM grain size<8). Finally, these products do not have foreign substances intermediate to the bound steel sheets, which distinguishes them from TRP diffusion bonded products and/or welded products.

One such product is a manifold. As used herein, the term "manifold" is intended to mean any construct of two or more metal sheets that contains channels etched into its interior. The manifold channels are formed by bonding etched steel plates in accordance with the invention. Preferably, the etched plates are mirror images of one another. These channels are leak proof and exhibit a rupture resistance of at least 340 bar (circa 5,000 psig.) Accordingly, the manifolds are extremely useful in managing the flow of materials in devices such as gas and liquid chromatographs.

Another such product would be any application where fine holes are needed in stainless steel that cannot be achieved by conventional machining. One or both of the steel sheets can be etched across one length, combined so that the etching lies on the interior, and bonded in accordance with the invention.

It should be understood that the above-described embodiments and examples are given by way of illustration, not limitation. Various changes and modifications within the spirit and scope of the present invention will become apparent to those skilled in the art from the present description.

In the claims:

1. A bonded product manufactured in the following manner:
   - supplying two 316 or 316L stainless steel sheets with each having a flat major surface with no layer thereon to promote bonding;
   - bringing the flat major surface of the each of the sheets into contacting relationship with each other and thereby forming an interface between them;
   - heating the contacting sheets in a vacuum furnace to a temperature substantially below melting temperature of such sheets;
   - urging the contacting sheets together under a load while the sheets are being heated; and
   - cooling the contacting sheets while under the load, the heating, loading, and cooling being sufficient to bond the sheets together by causing the grains of the stainless steel sheets to grow across the interface from one sheet to the other sheet.

2. The product of claim 1, wherein the heating in the vacuum furnace is conducted at a temperature of at least about 1700° F. and at least about 400° F. below the melting temperature of the steel sheets.

3. The product of claim 1, wherein the sheets are urged together with a load in the range of about 2000 to about 6400 pounds of force applied during the heating and the cooling steps.

4. The product of claim 1, wherein the load varies during the heating and cooling steps.

5. The product of claim 1, wherein the sheets are etched prior to contact, wherein the etchings form channels at the interface between the sheets, and wherein the channels, after the aforementioned heating, pressurizing and cooling steps, exhibit a rupture resistance of at least about 340 bar.

6. The product of claim 1, wherein the product is a manifold.

7. The product of claim 1 wherein the heating and cooling of the contacting sheets under the load in the vacuum furnace is accomplished in the presence of hydrogen at a reduced pressure of $2 \times 10E{-}4$ Torr.

* * * * *